(12) United States Patent
Nasu

(10) Patent No.: US 11,353,860 B2
(45) Date of Patent: Jun. 7, 2022

(54) DATA ANALYSIS DEVICE, SYSTEM, METHOD, AND RECORDING MEDIUM STORING PROGRAM

(71) Applicant: Mitsubishi Electric Corporation, Tokyo (JP)

(72) Inventor: Osamu Nasu, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 15/733,898

(22) PCT Filed: Aug. 3, 2018

(86) PCT No.: PCT/JP2018/029258
§ 371 (c)(1),
(2) Date: Dec. 1, 2020

(87) PCT Pub. No.: WO2020/026441
PCT Pub. Date: Feb. 6, 2020

(65) Prior Publication Data
US 2021/0223764 A1 Jul. 22, 2021

(51) Int. Cl.
*G06N 20/00* (2019.01)
*G05B 23/02* (2006.01)
*G06N 5/04* (2006.01)

(52) U.S. Cl.
CPC ......... *G05B 23/0229* (2013.01); *G06N 5/04* (2013.01); *G06N 20/00* (2019.01)

(58) Field of Classification Search
CPC ............ G05B 23/0229; G05B 23/0221; G05B 23/024; G06N 5/04; G06N 20/00; G06N 99/00
See application file for complete search history.

(56) References Cited

U.S. PATENT DOCUMENTS 6,125,346 A 9/2000 Nishimura et al.
2008/0033898 A1 2/2008 Hashimoto
(Continued)

FOREIGN PATENT DOCUMENTS

AU 2016370880 A1 5/2018
CN 1190236 A 8/1998
(Continued)

OTHER PUBLICATIONS

Suzuki et al., An Anomaly Detection System for Advanced Maintenance Services, 2014, Hitachi Review, vol. 63, No. 4, pp. 178-182 (Year: 2014).*

(Continued)

*Primary Examiner* — Toan M Le
(74) *Attorney, Agent, or Firm* — Xsensus LLP

(57) ABSTRACT

A data analysis device (1) according to the present disclosure includes a data collector (131) and a data organizer (135). The data collector (131) collects an input signal that is input from an apparatus connected to the data analysis device (1). The data organizer (135) removes, from among waveforms included in the input signal collected by the data collector (131), a waveform that has an appearance frequency lower than a reference frequency. The data organizer (135) generates learning data by collecting, from among the waveforms included in the input signal, waveforms that have an appearance frequency higher than the reference frequency.

18 Claims, 8 Drawing Sheets

(56) References Cited

U.S. PATENT DOCUMENTS

| | | |
|---|---|---|
| 2017/0223195 A1 | 8/2017 | Miyamori et al. |
| 2019/0310927 A1 | 10/2019 | Masuzaki et al. |

FOREIGN PATENT DOCUMENTS

| | | |
|---|---|---|
| CN | 106680649 A | 5/2017 |
| CN | 107026952 A | 8/2017 |
| CN | 107545228 A | 1/2018 |
| CN | 108351248 A | 7/2018 |
| JP | 2008-40682 A | 2/2008 |
| JP | 2013-8092 A | 1/2013 |
| JP | 2014-48994 A | 3/2014 |
| JP | 2015-35118 A | 2/2015 |
| JP | 2017-33470 A | 2/2017 |
| JP | 6362808 B1 | 7/2018 |

OTHER PUBLICATIONS

Google Search Results, May 14, 2021, 2 pp. (Year: 2021).*
Song et al., Automatic Decision Method of Optimum Symptom Parameters and Frequency Bands for Intelligent Machinery Diagnosis: Application to Condition Diagnosis of Centrifugal Pump System, Nov. 18, 2014, Advances in Mechanical Engineering, vol. 2014, Article ID 603408, 13 pp. (Year: 2014).*
International Search Report and Written Opinion dated Nov. 6, 2018, received for PCT Application No. PCT/JP2018/029258 Filed on Aug. 3, 2018, 7 Pages including English Translation.
Notice of Reasons for Refusal received for Japanese Patent Application No. 2019-529951, dated Jul. 2, 2019, 10 Pages including English Translation.
Notice of Reasons for Refusal received for Japanese Patent Application No. 2019-529951, dated Nov. 5, 2019, 10 Pages including English Translation.
Decision to Grant a Patent received for Japanese Patent Application No. 2019-529951, dated Feb. 18, 2020, 5 Pages including English Translation.
Office Action dated Jul. 27, 2021, in corresponding Chinese patent Application No. 201880096176.8, 19 pages.

* cited by examiner

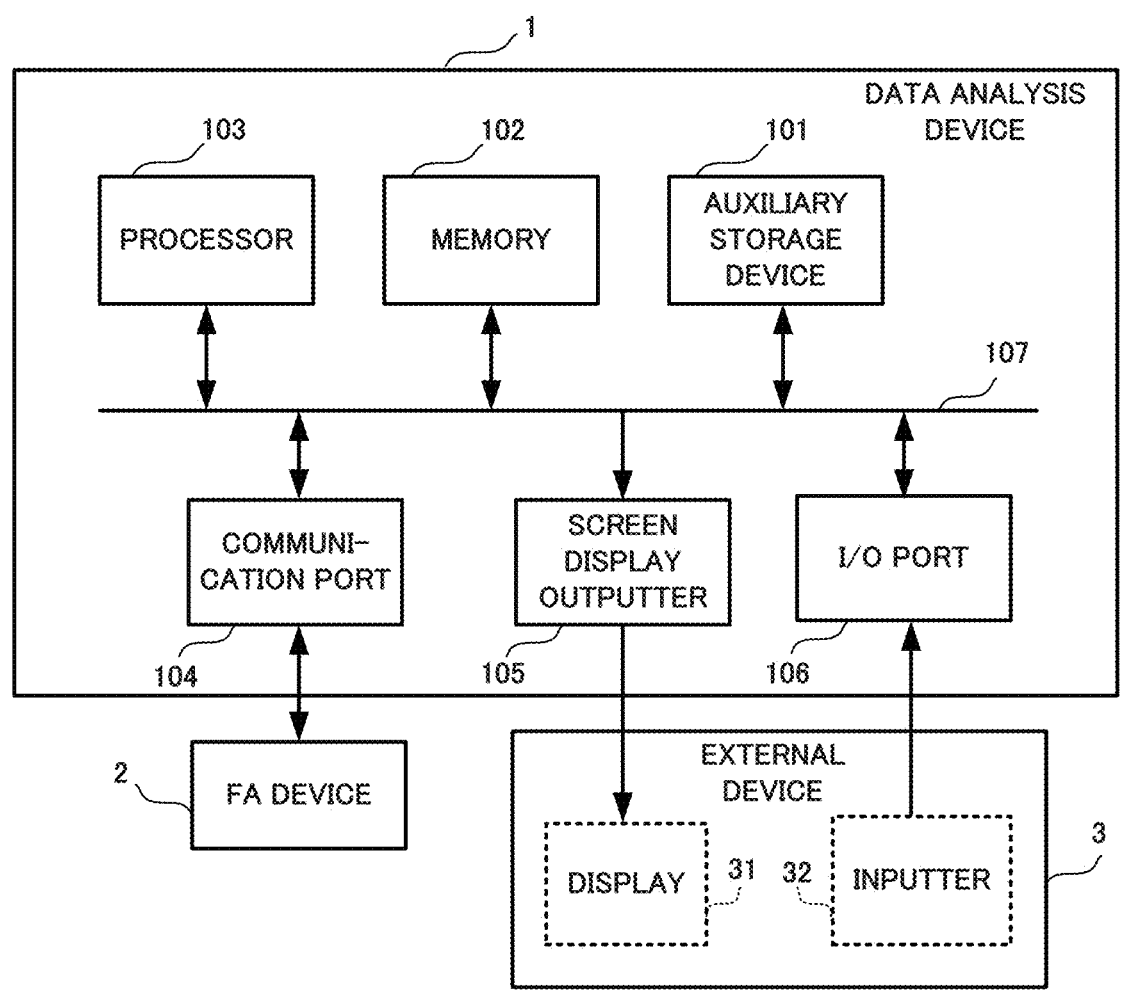

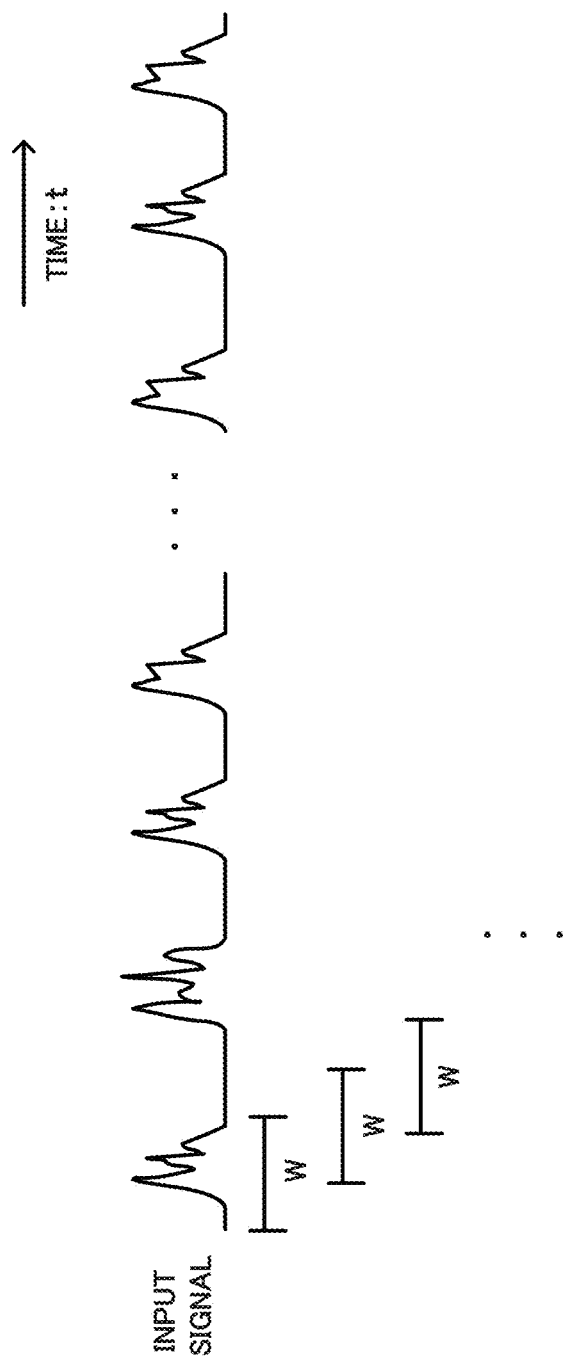

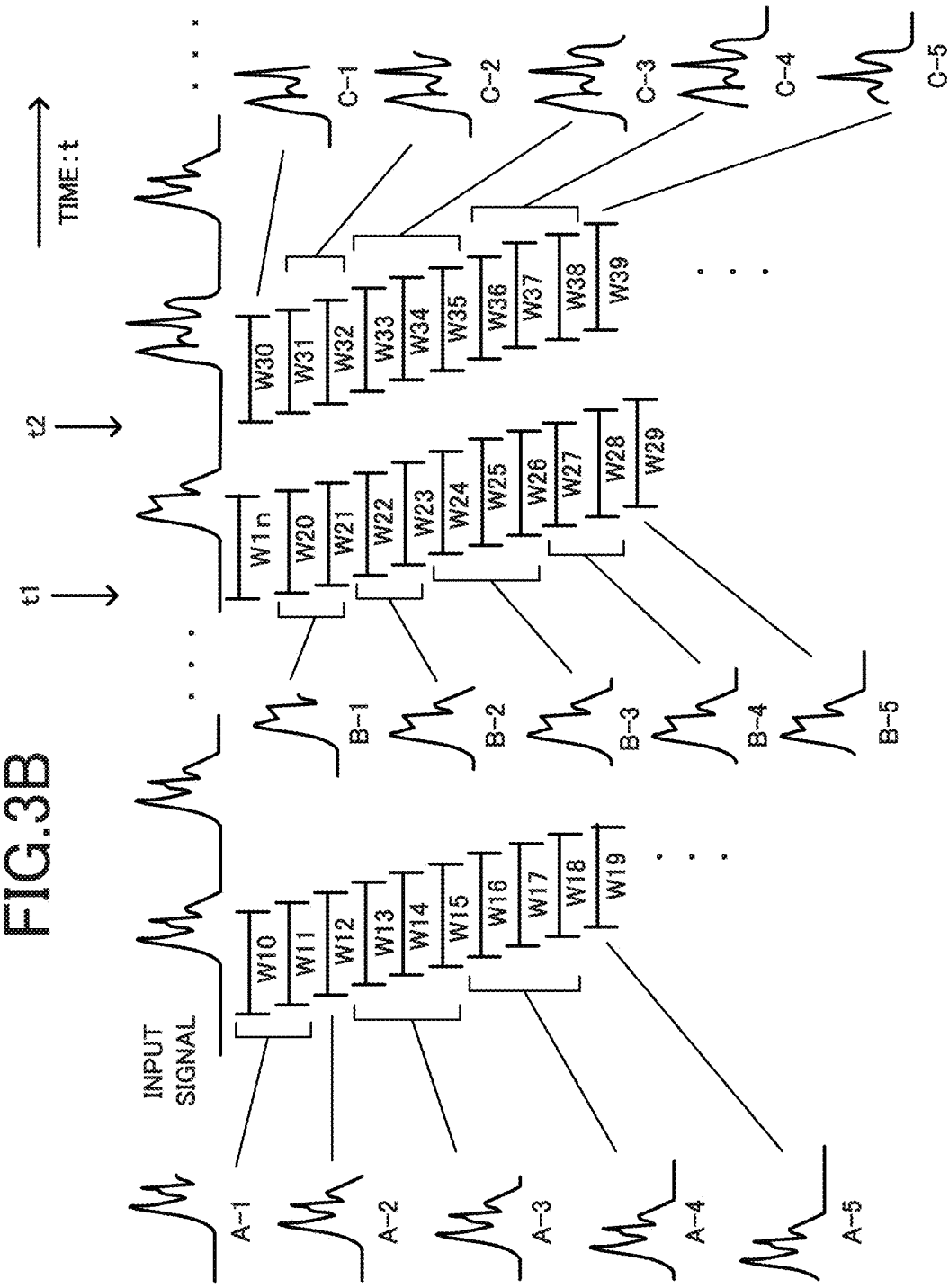

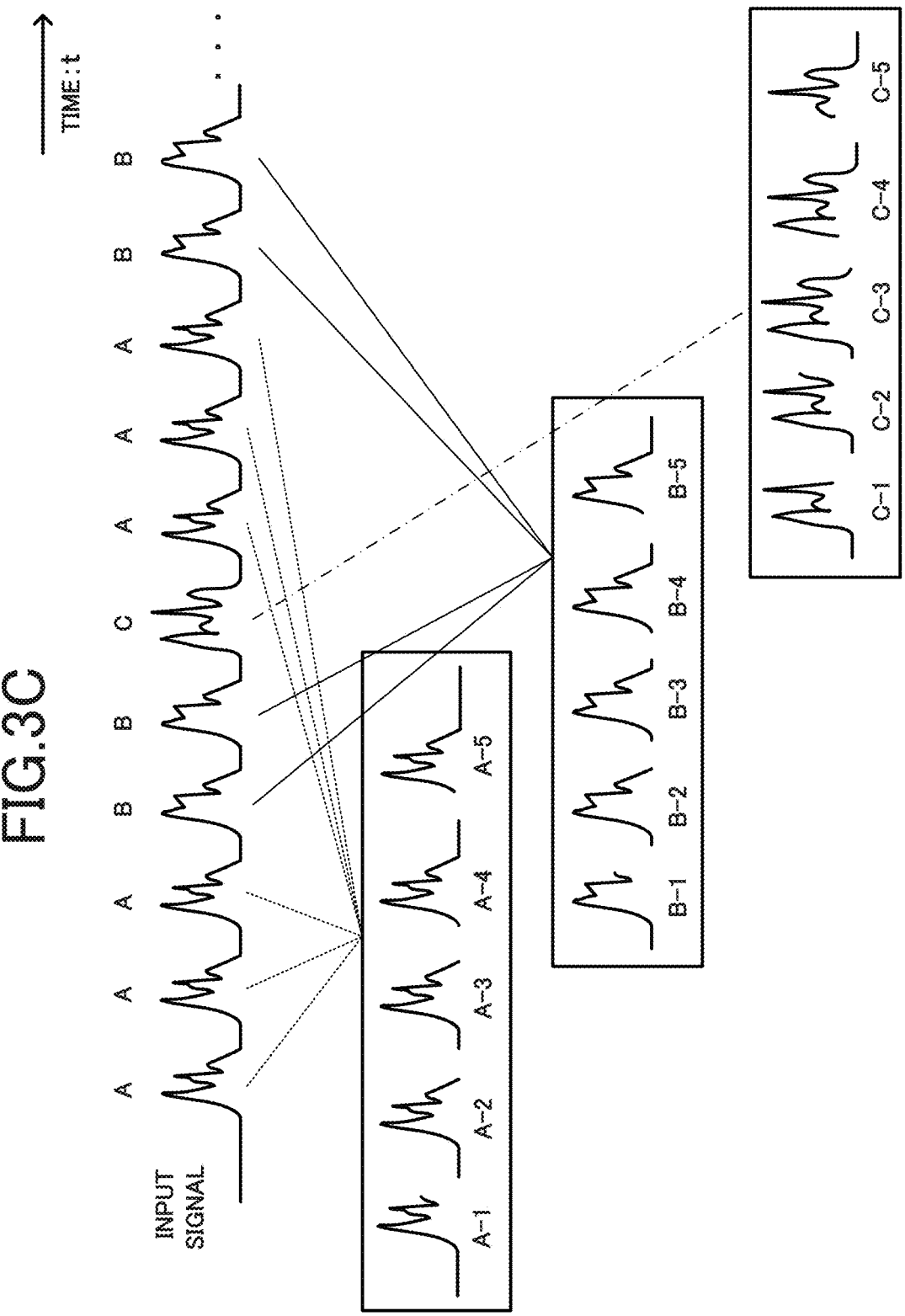

FIG.3D
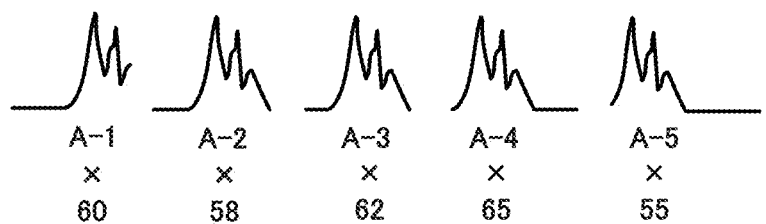
A-1   A-2   A-3   A-4   A-5
×    ×    ×    ×    ×
60   58   62   65   55
B-1   B-2   B-3   B-4   B-5
×    ×    ×    ×    ×
40   38   42   45   35
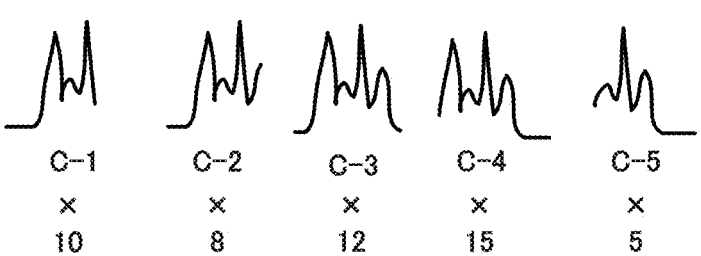
C-1   C-2   C-3   C-4   C-5
×    ×    ×    ×    ×
10   8    12   15   5
DELETE GROUPS C-1~C-5

DATA ANALYSIS DEVICE, SYSTEM, METHOD, AND RECORDING MEDIUM STORING PROGRAM

CROSS-REFERENCE TO RELATED APPLICATION

The present application is based on PCT filing PCT/JP2018/029258, filed Aug. 3, 2018, the entire contents of which are incorporated herein by reference.

TECHNICAL FIELD

The present disclosure relates to a data analysis device, a system, a method, and a program.

BACKGROUND ART

Automation of manufacturing processes in factories is progressing by employment of factory automation (FA) apparatuses such as an industrial robot, a sensor, and a sequencer. Such FA apparatuses are required to perform normal operation stably. Due to this, a diagnosis device is under development that diagnoses whether the FA apparatus operates normally or malfunctions, and upon diagnosis that the FA apparatus malfunctions, quickly sends notification to that effect.

For example, Patent Literature 1 discloses a diagnosis system in which diagnosis as to whether mechanical equipment is in a normal state is performed by determining, during operation of the mechanical equipment, whether a waveform of a signal output from a sensor is normal. According to this diagnosis system, a normal model of a waveform of a signal output from the sensor of the mechanical equipment is learned, and a determination is made based on the learned normal model as to whether the waveform of the signal output from the sensor is normal.

CITATION LIST

Patent Literature

Patent Literature 1: Unexamined Japanese Patent Application Publication No. 2017-033470

SUMMARY OF INVENTION

Technical Problem

According to the diagnosis system disclosed in Patent Literature 1, normalization of detection values of a signal detected from the sensor is performed, and the normal model of the waveform is generated by analyzing the normalized detection values using anon-hierarchical cluster analysis method. As a non-hierarchical cluster analysis method is a method performed by sorting diagnosis target data into freely-selected number of clusters, the result of analysis may vary depending on the method employed to perform the sorting into clusters. Thus, according to the diagnosis system disclosed in Patent Literature 1, the normal model is generated based on an analysis result that can have variance. Maintenance of high accuracy of the normal model is therefore difficult.

Further, according to the diagnosis system disclosed in Patent Literature 1, the normal model of the waveform is generated based on a result of analysis that is performed by normalizing detection values of waveforms detected by the sensor on the mechanical equipment and analyzing the normalized detection values using a non-hierarchical duster analysis method. This leads to laborious processing for generating the normal model of the waveform.

As described above, the diagnosis system disclosed in Patent Literature 1 has difficulty in maintaining high accuracy of the normal model of the waveform, and employment of this diagnosis system leads to laborious processing for generating the normal model of the waveform. This causes difficulty in achieving simple generation of highly-accurate learning data based on the normal model of the waveform.

The present disclosure is made to solve the aforementioned problems, and an objective of the present disclosure is to provide a data analysis device, a system, a method and a program that enable simple generation of highly-accurate learning data.

Solution to Problem

To achieve the aforementioned objective, a data analysis device according to the present disclosure includes a data collector and a data organizer. The data collector collects an input signal that is input from an apparatus connected to the data analysis device. The data organizer removes, from among waveforms included in the input signal collected by the data collector, a waveform that has an appearance frequency lower than a reference frequency. The data organizer generates learning data by collecting, from among the waveforms included in the input signal, waveforms that have an appearance frequency higher than the reference frequency.

Advantageous Effects of Invention

The present disclosure includes removing, from among waveforms included in the input signal, a waveform that has an appearance frequency lower than a reference frequency, and thus simple generation of highly-accurate learning data can be easily achieved.

BRIEF DESCRIPTION OF DRAWINGS

FIG. 2 is a block diagram illustrating an example of hardware configuration of the data analysis device according to the embodiment;

FIG. 3A illustrates an outline of a method for cutting out waveforms from an input signal according to the embodiment;

FIG. 3B is a diagram for explanation of an example method for performing grouping of waveform data items that are cut out according to the embodiment;

FIG. 3C illustrates an example grouping of the waveform data items that are cut out according to the embodiment;

FIG. 3D is a diagram for explanation of deletion of waveform data items according to the embodiment;

DESCRIPTION OF EMBODIMENTS

Hereinafter, a data analysis device according to an embodiment of the present disclosure is described. The data analysis device includes a learning mode and a diagnosis mode. The data analysis device, in operating in the learning mode, generates highly-accurate learning data based on a signal output from a factory automation (FA) apparatus and learns the learning data. Further, the data analysis device, in operating in the diagnosis mode, compares a learning result that is a result of the learning and a monitoring signal output from the FA apparatus that is a diagnosis target, thereby diagnosing as to whether the FA apparatus operates normally or operates abnormally.

Figure 1:
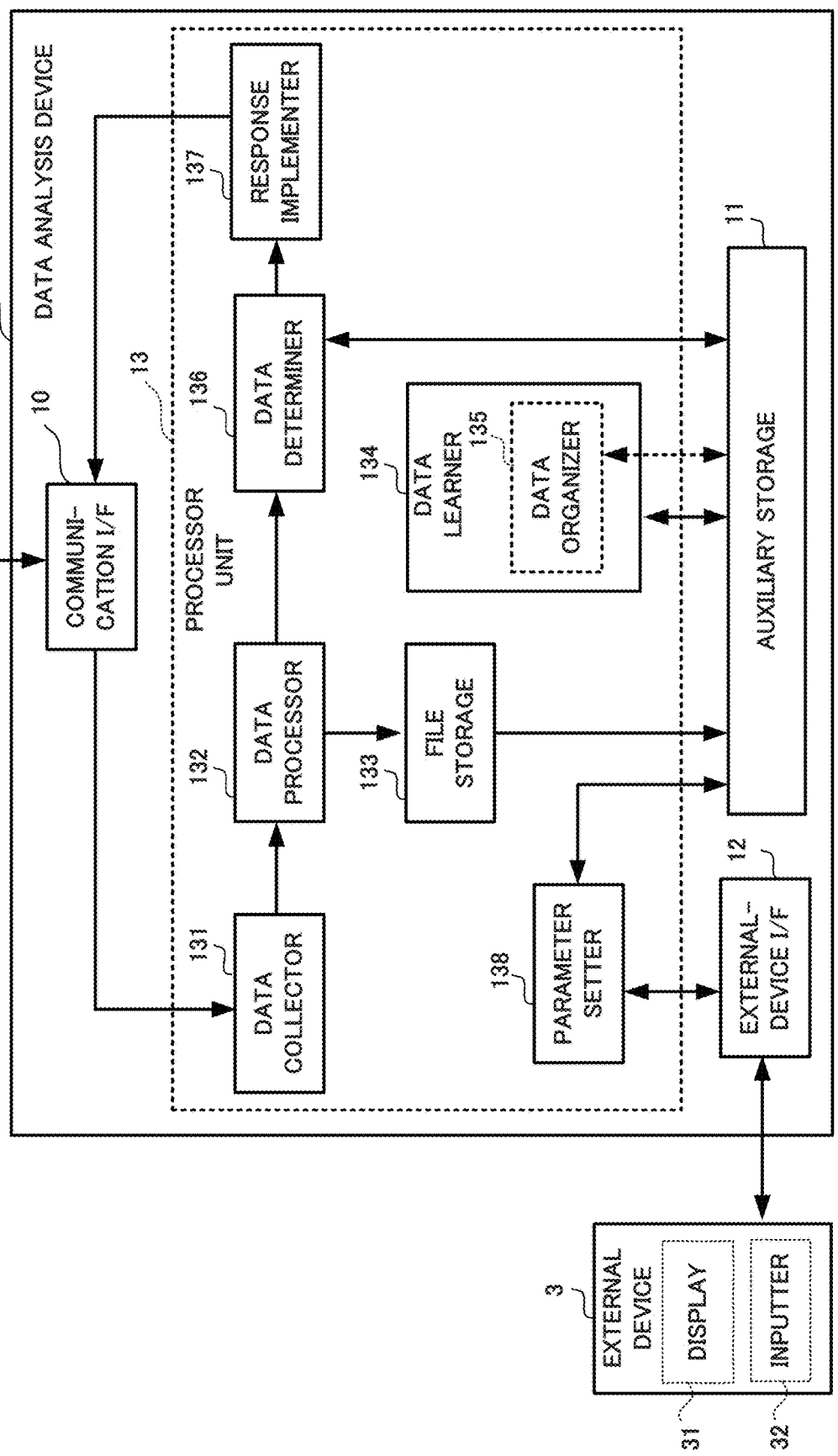
FIG. 1 is a schematic diagram of a data analysis device according to an embodiment.

A data analysis device 1 according to the present embodiment includes, as illustrated in FIG. 1, a communication interface (I/F) 10 connected to an FA apparatus 2 that is a diagnosis target, an auxiliary storage 11 that stores data, an external-apparatus I/F 12 that inputs data to and outputs data from an external apparatus 3, and a processor unit 13 that processes data.

The communication IF 10 is an interface connected to the diagnosis target FA apparatus 2. The data analysis device 1 receives, via the communication I/F 10, an input signal that is input from the FA apparatus 2. Further, the data analysis device 1 transmits, via the communication I/F 10, a control signal to the FA apparatus 2.

The auxiliary storage 11 is a storage that stores various types of data to be processed by the processor unit 13 described later.

The external-apparatus I/F 12 is an interface connected to the external apparatus 3. The external apparatus 3 includes an input/output terminal including a display 31 and an inputter 32. An engineering tool is installed in the external apparatus 3. The engineering tool is a tool for setting of, for example, information and various types of parameters used by the processor unit 13 to perform processing described later. A user can, using the engineering tool, input from the inputter 32 of the external apparatus 3 various types of parameters, setting information or the like, and store the parameters, setting information, or the like in the auxiliary storage 11 via the external-apparatus I/F 12. Further, the user can cause the external apparatus 3 to receive, via the external-apparatus I/F 12, the parameters, setting information, or the like stored in the auxiliary storage 11 and can view such in expanded form on the display 31 using the engineering tool.

The processor unit 13 includes a data collector 131 that collects the input signal, a data processor 132 that processes the collected signal, a file storage 133 that stores data in the auxiliary storage 11, a data learner 134 that learns the learning data, a data organizer 135 that generates the learning data, a data determiner 136 that determines whether a waveform data item of a monitoring target matches the learning data, a response implementer 137 that transmits a response signal to the diagnosis target FA apparatus 2, and a parameter setter 138 that sets the parameters. Each of these functional blocks is achieved by, as described later, a processor and software executed by the processor.

The data collector 131 collects, via the communication I/F 10, the input signal that is input from the FA apparatus 2. The data processor 132 processes a waveform of the input signal that is input from the FA apparatus 2 and is collected by the data collector 131 into a form for easy processing thereafter. The processing of the waveform of the input signal is, for example, edging the waveform of the input signal to clarify precipitous portions thereof or smoothing the waveform of a noisy input signal to smoothly transform the waveform. The file storage 133 stores the input signal processed by the data processor 132 in the auxiliary storage 11.

The data learner 134 learns the input signal processed by the data processor 132 and stored in the auxiliary storage 11. Here "learns" means (i) generating partial waveforms by dividing the input signal stored in the auxiliary storage 11, (ii) grouping these partial waveforms by grouping together partial waveforms that are similar to each other, and then (iii) determining, for each group, a representative waveform that is representative of the corresponding group. The data learner 134 stores the grouped partial waveforms in the auxiliary storage 11. Further, the data learner 134 stores, in the auxiliary storage 11, the representative waveforms of the groups as a learning result. The processing performed by the data learner 134 is described later in detail.

The data organizer 135 is included in the data learner 134. The data organizer 135 organizes the grouped partial waveforms stored in the auxiliary storage 11. Here "organizes" means (i) deleting a group that includes waveforms having an appearance frequency equal to or lower than a reference frequency and (ii) leaving only groups for which an appearance frequency of the partial waveform is higher than or equal to the reference frequency. The data organizer 135 generates the learning data based on the groups remaining after the organization. The data organizer 135 stores the generated learning data in the auxiliary storage 11. The processing performed by the data organizer 135 is described later in detail.

The data determiner 136 determines, based on the learning result stored in the auxiliary storage 11, whether a waveform data item of the monitoring signal input from the diagnosis target FA apparatus 2 matches the learning data. The data determiner 136 stores a determination result in the auxiliary storage 11. Further, the data determiner 136 transmits the determination result to the response implementer 137. In the data determiner 136, the operation of determining whether the waveform data item of the monitoring signal input from the diagnosis target FA apparatus 2 matches the learning data and the operation of storing the determination result in the auxiliary storage 11 are operations that are performed during operation in the diagnosis mode only.

The response implementer 137, based on the determination result received from the data determiner 136, transmits the response signal to the diagnosis target FA apparatus 2. For example, when the monitoring signal input from the diagnosis target FA apparatus 2 matches a normal model, the response implementer 137 receives from the data determiner 136 the determination result indicating such matching. The response implementer 137 waits until the next determination result is received. Conversely, when the monitoring signal input from the diagnosis target FA apparatus 2 does not match the normal models, the response implementer 137 receives from the data determiner 136 the determination result indicating non-matching, and transmits a signal corresponding to the determination result to the diagnosis target FA apparatus 2 via the communication I/F 10. The signal corresponding to the determination result is, for example, a stop signal to stop the operation of the diagnosis target FA apparatus 2, a slowdown instruction signal to slow down the operation of the diagnosis target FA apparatus 2, and a signal to cause the diagnosis target FA apparatus 2 to perform an operation that the user desires. Types of signals transmitted as a signal corresponding to the determination result can be set by using the engineering tool operating on the external apparatus 3.

The parameter setter 138 is connected to the external apparatus 3 via the external-apparatus I/F 12. The parameter setter 138, in accordance with instructions from the external apparatus 3, registers various types of parameters in the auxiliary storage 11 and updates the parameters, and in accordance with an instruction from the external apparatus 3, reads the parameters registered in the auxiliary storage 11 and provides the parameters to the external apparatus 3.

The learning mode and the diagnosis mode of the data analysis device 1 are achieved by operations of the functional blocks of the processor unit 13. The data collector 131, the data processor 132, the file storage 133, the data learner 134, and the data organizer 135 operate in the learning mode. The data collector 131, the data processor 132, the data determiner 136, and the response implementer 137 operate in the diagnosis mode. Causing the file storage 133, the data learner 134, and the data organizer 135 to operate during operation in the diagnosis mode enables, simultaneous with the diagnosis of the FA apparatus 2, performing the learning and updating the learning result. The operations in the learning mode and the diagnosis mode are described later in detail.

FIG. 2 illustrates an example of hardware configuration of the data analysis device 1. The data analysis device 1 includes, as hardware components thereof an auxiliary storage device 101, a memory 102, a processor 103, a communication port 104, a screen display outputter 105, an input/output (I/O) port 106, and an internal bus 107. The auxiliary storage device 101, the memory 102, the processor 103, the communication port 104, the screen display outputter 105, and the I/O port 106 are mutually connected via the internal bus 107.

The auxiliary storage device 101 is a storage device to achieve the auxiliary storage 11 illustrated in FIG. 1. The auxiliary storage device 101 stores various types of programs to be executed by the processor 103 described later, various types of data, or the like. The auxiliary storage device 101 includes a volatile semiconductor memory or a non-volatile semiconductor memory such as a flash memory, an erasable programmable read only memory (EPROM), and electrically erasable programmable read only memory (EEPROM), and a memory element and a storage medium such as a magnetic disk, a flexible disk, an optical disk, a compact disc, a mini disk, and a digital versatile disc (DVD).

The memory 102 is a memory element into which various types of programs stored in the auxiliary storage device 101 are loaded by the processor 103. The memory 102 includes a volatile semiconductor memory or a non-volatile semiconductor memory into which data can be written at a high speed, such as random access memory (RAM) and a flash memory.

The processor 103 is a processing unit that loads various types of programs stored in the auxiliary storage device 101 into the memory 102 described above and executes the programs. The processor 103 achieves the processor unit 13 illustrated in FIG. 1. The processor 103 includes a processing unit such as central processing unit (CPU) and microprocessing unit (MPU).

The communication port 104 is an interface for connection between the FA apparatus 2 and the data analysis device 1. As the communication port 104, Ethernet®, various types of communication interfaces, or the like can be employed. The communication port 104 achieves the communication I/F 10 illustrated in FIG. 1.

The screen display outputter 105 is an image generation device that generates an image to be displayed by the display 31 of the external apparatus 3. A video signal output device, such as a video card, a graphics processing unit (GPU), and a graphic board, can be employed as the screen display outputter 105.

The display 31 of the external apparatus 3 includes a display interface device such as a liquid crystal display (LCD) and an organic electro-luminescence (EL) panel. The inputter 32 of the external apparatus 3 includes an input device that enables inputting of information, such as a keyboard and a touch panel. The external apparatus 3 is an input/output terminal that includes the display 31 and the inputter 32 that are described above, such as a personal computer and a tablet terminal.

The I/O port 106 is an interface for transmission and reception of data between the external apparatus 3 and the data analysis device 1. The I/O port 106 achieves the external-apparatus I/F 12 illustrated in FIG. 1.

The data analysis device 1 according to the present embodiment, when operating in the learning mode, generates highly-accurate learning data based on a signal output from the FA apparatus 2 and learns the learning data. This highly-accurate learning data is obtained by leaving only, among waveforms of the signal output from the FA apparatus 2, waveforms that apply to the normal models. A method for leaving only the waveforms that apply to the normal models among the waveforms of the signal output from the FA apparatus 2 is described with reference to FIGS. 3A-3D. This method is implemented by the data learner 134 and the data organizer 135 that are illustrated in FIG. 1.

FIG. 3A illustrates an example input signal that is input from the FA apparatus 2 into the data analysis device 1. For example, flat portions of a waveform of this input signal indicate intervals in which an operation process such as processing of a workpiece is not performed by the FA apparatus 2, and non-flat portions of the waveform of this input signal indicate intervals in which an operation process such as processing of a workpiece is performed by the FA apparatus 2.

First, the data learner 134 performs, at a predetermined interval W in order from the head of the input signal, cutting out from the input signal that is output from the FA apparatus 2 into the data analysis device 1. Specifically, the data learner 134 cuts out waveforms of the input signal by superimposing the interval W on time t and shifting the interval W in single sample period increments. Hereinafter, these waveforms of the input signal that are obtained by performing the cutout are referred to as partial waveforms.

Each of these partial waveforms is compared with all partial waveforms of intervals preceding the corresponding partial waveform, and a determination is made for each comparison, in accordance with a predetermined reference for determination, as to whether waveforms under the comparison are similar to each other. Here "similar" means that a difference between a shape of one waveform and a shape of another waveform serving as a reference is equal to or less than a predetermined threshold value. The difference between shapes of waveforms can be obtained using various types of known similarity calculations.

An example of employing, as a method for comparing partial waveforms, a method of superimposing freely-selected two partial waveforms and obtaining a sum of square errors in wave height values of the partial waveforms at sample points, is described below. In the case of matching in shapes of freely-selected two partial waveforms, each square error in wave height values of the partial waveforms at the corresponding sample points is 0, and thus a sum of the square errors of the partial waveforms also is 0. That is to say, the more similar two partial waveforms are, the smaller the sum of square errors in wave height values of the partial waveforms at sample points becomes, and the more dissimilar two partial waveforms are, the larger the sum of square errors in wave height values of the waveforms at sample points becomes. Thus, when a sum of square errors in wave height values of waveforms at sample points is equal to or smaller than a predetermined threshold value, the determination is made that the waveforms are similar to each other.

Conversely, when a sum of square errors in wave height values of waveforms at sample points is larger than or equal to the predetermined threshold value, the determination is made that the waveforms are not similar to each other. This threshold value is set by, for example, using the engineering tool operating on the external apparatus 3.

Then, grouping of the partial waveforms is performed by, in accordance with a predetermined classification basis, grouping together partial waveforms that are similar to each other. This grouping is performed by the data learner 134 illustrated in FIG. 1. Hereinafter, an example method for this data grouping is described with reference to FIG. 3B.

As illustrated in FIG. 3B, the cutout from the input signal is performed at intervals W10, W11, W12, W13, W14, and the like. The intervals W10, W11, W12, W13, W14, and the like, which are obtained by performing shifting in single sample period increments, have the same length and overlap one another. These characteristics of the intervals W10-W19 are possessed by intervals W20-W29 and by intervals W30-W39 that are described later.

As the interval W10 is an initial interval, there is no partial waveform to be compared with a partial waveform of the interval W10. Thus the partial waveform of the interval W10 is classified as being in a group A-1 that is a new group.

Then a partial waveform of the interval W11 is compared with the partial waveform of the interval W10. In the present embodiment, the partial waveform of the interval W10 and the partial waveform of the interval W11 are similar to each other. Thus, the partial waveform of the interval W11 is also classified as being in the group A-1.

Then a partial waveform of the interval W12 is compared with the partial waveform of the interval W10 that is the first waveform in the group A-1. In the present embodiment, the partial waveform of the interval W12 and the partial waveform of the interval W10 that is the first waveform in the group A-1 are dissimilar. Thus, the partial waveform of the interval W12 is classified as being in a group A-2 that is different from the A-1 group to which the partial of the interval W10 belongs.

Then a partial waveform of the interval W13 is compared with (i) the partial waveform of the interval W10 that is the first waveform in the group A-1 and (ii) the partial waveform of the interval W12 that is the first waveform in the group A-2. In the present embodiment, the partial waveform of the interval W13 is dissimilar to the partial waveform of the interval W10 that is the first waveform in the group A-1 and the partial waveform of the interval W12 that is the first waveform in the group A-2. Thus, the partial waveform of the interval W13 is classified as being in a group A-3 that is different from the group A-1 to which the partial of the interval W10 belongs and the group A-2 to which the partial of the interval W12 belongs.

Then a partial waveform of the interval W14 is compared with the partial waveform of the interval W10 that is the first waveform in the group A-1, the partial waveform of the interval W12 that is the first waveform in the group A-2, and the partial waveform of the interval W13 that is the first waveform in the group A-3. In the present embodiment, the partial waveform of the interval W14 is dissimilar to the partial waveform of the interval W10 that is the first waveform in the group A-1 and the partial waveform of the interval W12 that is the first waveform in the group A-2, but is similar to the partial waveform of the interval W13 that is the first waveform in the group A-3. Thus, the partial waveform of the interval W14 is classified as being in the group A-3.

Then a partial waveform of the interval W15 is compared with the partial waveform of the interval W10 that is the first waveform in the group A-1, the partial waveform of the interval W12 that is the first waveform in the group A-2, and the partial waveform of the interval W13 that is the first waveform in the group A-3. In the present embodiment, the partial waveform of the interval W15 is dissimilar to the partial waveform of the interval W10 that is the first waveform in the group A-1 and the partial waveform of the interval W12 that is the first waveform in the group A-2, but is similar to the partial waveform of the interval W13 that is the first waveform in the group A-3. Thus, the partial waveform of the interval W15 is classified as being in the group A-3.

Then a partial waveform of the interval W16 is compared with the partial waveform of the interval W10 that is the first waveform in the group A-1, the partial waveform of the interval W12 that is the first waveform in the group A-2, and the partial waveform of the interval W13 that is the first waveform in the group A-3. In the present embodiment, the partial waveform of the interval W16 is dissimilar to the partial waveform of the interval W10 that is the first waveform in the group A-1, the partial waveform of the interval W12 that is the first waveform in the group A-2, and the partial waveform of the interval W13 that is the first waveform in the group A-3. Thus, the partial waveform of the interval W16 is classified as being in a group A-4 that is different from the group A-1 to which the partial waveform of the interval W10 belongs, the group A-2 to which the partial waveform of the interval W12 belongs, and the group A-3 to which the partial waveform of the interval W13 belongs.

Then a partial waveform of the interval W17 is compared with the partial waveform of the interval W10 that is the first waveform in the group A-1, the partial waveform of the interval W12 that is the first waveform in the group A-2, the partial waveform of the interval W13 that is the first waveform in the group A-3, and the partial waveform of the interval W16 that is the first waveform in the group A-4. In the present embodiment, the partial waveform of the interval W17 is dissimilar to the partial waveform of the interval W10 that is the first waveform in the group A-1, the partial waveform of the interval W12 that is the first waveform in the group A-2, and the partial waveform of the interval W13 that is the first waveform in the group A-3, but is similar to the partial waveform of the interval W16 that is the first waveform in the group A-4. Thus, the partial waveform of the interval W17 is classified as being in the group A-4.

A partial waveform of the interval W18 is compared with the partial waveform of the interval W10 that is the first waveform in the group A-1, the partial waveform of the interval W12 that is the first waveform in the group A-2, the partial waveform of the interval W13 that is the first waveform in the group A-3, and the partial waveform of the interval W16 that is the first waveform in the group A-4. In the present embodiment, the partial waveform of the interval W18 is dissimilar to the partial waveform of the interval W10 that is the first waveform in the group A-1, the partial waveform of the interval W12 that is the first waveform in the group A-2, and the partial waveform of the interval W13 that is the first waveform in the group A-3, but is similar to the partial waveform of the interval W16 that is the first waveform in the group A-4. Thus, the partial waveform of the interval W18 is classified as being in the group A-4.

Then a partial waveform of the interval W19 is compared with the partial waveform of the interval W10 that is the first waveform in the group A-1, the partial waveform of the interval W12 that is the first waveform in the group A-2, the partial waveform of the interval W13 that is the first waveform in the group A-3, and the partial waveform of the interval W16 that is the first waveform in the group A-4. In the present embodiment, the partial waveform of the interval W19 is dissimilar to the partial waveform of the interval W10 that is the first waveform in the group A-1, the partial waveform of the interval W12 that is the first waveform in the group A-2, the partial waveform of the interval W13 that is the first waveform in the group A-3, and the partial waveform of the interval W16 that is the first waveform in the group A-4. Thus, the partial waveform of the interval W19 is classified as being in a group A-5 that is different from the group A-1 to which the partial waveform of the interval W10 belongs, the group A-2 to which the partial waveform of the interval W12 belongs, the group A-3 to which the partial waveform of the interval W13 belongs, and the group A-4 to which the partial waveform of the interval W16 belongs.

When, for example, the FA apparatus 2 repeatedly performs an operation process of sequentially applying the same processing to a workpiece, the input signal input from the FA apparatus 2 into the data analysis device 1 includes that same repeated waveform. That is to say, the same processing is repeatedly performed during a period in which the FA apparatus 2 repeats the same operation process normally. Thus, in the processing thereafter, each of partial waveforms following the interval W19 is compared with the first partial waveforms of the groups A-1-A-5 and is classified as being in a group to which a similar first partial waveform belongs.

In the present embodiment, the FA apparatus 2 starts at a timing t1 a new operation process of, for example, cleaning the workpiece in the FA apparatus 2. Cutting out from an input signal after starting of this new operation process is performed at intervals W20, W21, W22, and the like. An interval followed by the interval W20 is an interval Win, and the partial waveforms of the intervals W10-W1n are classified as being in one of the groups A-1-A-5.

First, a partial waveform of the interval W20 is compared with the first partial waveforms of the groups A-1-A-5. In the present embodiment, the partial waveform of the interval W20 is dissimilar to any of the first partial waveforms of the groups A-1-A-5. Thus, the partial waveform of the interval W20 is classified as being in a group B-1 that is different from the groups A-1-A-5.

Then a partial waveform of the interval W21 is compared with the first partial waveforms of the groups A-1-A-5 and the partial waveform of the interval W20 that is the first partial waveform of the group B-1. In the present embodiment, the partial waveform of the interval W21 is dissimilar to any of the first partial waveforms of the groups A-1-A-5, but is similar to the partial waveform of the interval W20 that is the first partial waveform of the group B-1. Thus, the partial waveform of the interval W21 is classified as being in the group B-1 to which the partial waveform of the interval W20 belongs.

Then a partial waveform of the interval W22 is compared with the first partial waveforms of the groups A-1-A-5 and the partial waveform of the interval W20 that is the first partial waveform of the group B-1. In the present embodiment, the partial waveform of the interval W22 is dissimilar to any of the first partial waveforms of the groups preceding and compared with the interval W22. Thus, the partial waveform of the interval W22 is classified as being in group B-2 that is different from the groups A-1-A-5 and the group B-1 to which the partial waveform of the interval W20 belongs.

A partial waveform of the interval W23 is compared with the first partial waveforms of the groups A-1-A-5 and the groups B-1-B-2. In the present embodiment, the partial waveform of the interval W23 is similar to the partial waveform of the interval W22 that is the first partial waveform of the group B-2. Thus, the partial waveform of the interval W23 is classified as being in the group B-2 to which the partial waveform of the interval W22 belongs.

Then a partial waveform of the interval W24 is compared with the first partial waveforms of the groups A-1-A-5 and the groups B-1-B-2. In the present embodiment, the partial waveform of the interval W24 is dissimilar to any of the first partial waveforms of the preceding groups. Thus, the partial waveform of the interval W24 is classified as being in a group B-3 that is different from any of the preceding groups.

Then partial waveforms of the intervals W25 and 26 are each compared with the first partial waveforms of the groups A-1-A-5 and the groups B-1-B-3. In the present embodiment, the partial waveforms of the intervals W25 and W26 are similar to the partial waveform of the interval W24 that is the first partial waveform of the group B-3 and are dissimilar to the first partial waveforms of the other groups. Thus, the partial waveforms of the intervals W25 and W26 are classified as being in the group B-3 to which the partial waveform of the interval W24 belongs.

Then a partial waveform of the interval W27 is compared with the first partial waveforms of the groups A-1-A-5 and the groups B-1-B-3. In the present embodiment, the partial waveform of the interval W27 is dissimilar to any of the first partial waveforms of the preceding groups. Thus, the partial waveform of the interval W27 is classified as being in a group B-4 that is different from any of the preceding groups.

Then a partial waveform of the interval W28 is compared with the first partial waveforms of the groups A-1-A-5 and the groups B-1-B-4. In the present embodiment, the partial waveform of the interval W28 is similar to the partial waveform of the interval W27 that is the first partial waveform of the group B-4 and is dissimilar to the first partial waveforms of the other groups. Thus, the partial waveform of the interval W28 is classified as being in the group B-4 to which the partial waveform of the interval W27 belongs.

Then a partial waveform of the interval W29 is compared with the first partial waveforms of the groups A-1-A-5 and the groups B-1-B4. In the present embodiment, the partial waveform of the interval W29 is dissimilar to any of the first partial waveforms of the preceding groups. Thus, the partial waveform of the interval W29 is classified as being in a group B-5 that is different from any of the preceding groups.

In the present embodiment, at a timing t2 immediately after completion of the classification processing of the interval W29, a waveform different from the waveforms that each belong to one of the groups A-1-A-5 and the groups B-1-B-5 is input. This is caused by, for example, occurrence of an error that causes changing in the waveform after occurrence of the error, such as a workpiece becoming caught by a blade. Cutting out from an input signal after the timing t2 is performed at intervals W30, W31, W32, and the like.

First, a partial waveform of the interval W30 is compared with the first partial waveforms of the groups A-1-A-5 and the groups B-1-B-5. In the present embodiment, the partial waveform of the interval W30 is dissimilar to any of the first partial waveforms of the groups A-1-A-5 and the groups B-1-B-5. Thus, the partial waveform of the interval W30 is classified as being in a group C-1 that is different from the groups A-1-A-5 and the groups B-1-B-5.

Then a partial waveform of the interval W31 is compared with the first partial waveforms of the groups A-1-A-5, the groups B-1-B-5, and the group C-1. In the present embodiment, the partial waveform of the interval W31 is dissimilar to any of the first partial waveforms of the preceding groups. Thus, the partial waveform of the interval W31 is classified as being in a group C-2 that is different from any of the preceding groups.

Then a partial waveform of the interval W32 is compared with the first partial waveforms of the groups A-1-A-5, the groups B-1-B-5, and the groups C-1-C-2. In the present embodiment, the partial waveform of the interval W32 is similar to the partial waveform of the interval W31 that is the first partial waveform of the group C-2 and is dissimilar to the first partial waveforms of the other groups. Thus, the partial waveform of the interval W32 is classified as being in the group C-2 to which the partial waveform of the interval W31 belongs.

Then a partial waveform of the interval W33 is compared with the first partial waveforms of the groups A-1-A-5, the groups B-1-B-5, and the groups C-1-C-2. In the present embodiment, the partial waveform of the interval W33 is dissimilar to any of the first partial waveforms of the preceding groups. Thus, the partial waveform of the interval W33 is classified as being in a group C-3 that is different from any of the preceding groups.

Then partial waveforms of the intervals W34 and W35 are compared with the first partial waveforms of the groups A-1-A-5, the groups B-1-B-5, and the groups C-1-C-3. In the present embodiment, the partial waveforms of the intervals W34 and W35 are similar to the partial waveform of the interval W33 that is the first partial waveform of the group C-3, and are dissimilar to the first partial waveforms of the other groups. Thus, the partial waveforms of the intervals W34 and W35 are classified as being in the group C-3 to which the partial waveform of the interval W33 belongs.

Then a partial waveform of the interval W36 is compared with the first partial waveforms of the groups A-1-A-5, the groups B-1-B-5, and the groups C-1-C-3. In the present embodiment, the partial waveform of the interval W36 is dissimilar to any of the first partial waveforms of the preceding groups. Thus, the partial waveform of the interval W36 is classified as being in a group C-4 that is different from any of the preceding groups.

Then partial waveforms of the intervals W37 and W38 are compared with the first partial waveforms of the groups A-1-A-5, the groups B-1-B-5, and the groups C-1-C-4. In the present embodiment, the partial waveforms of the intervals W37 and W38 are similar to the partial waveform of the interval W36 that is the first partial waveform of the group C-4, and are dissimilar to the first partial waveforms of the other groups. Thus, the partial waveforms of the intervals W37 and W38 are classified as being in the group C-4 to which the partial waveform of the interval W36 belongs.

Then a partial waveform of the interval W39 is compared with the first partial waveforms of the groups A-1-A-5, the groups B-1-B-5, and the groups C-1-C-4. In the present embodiment, the partial waveform of the interval W39 is dissimilar to any of the first partial waveforms of the preceding groups. Thus, the partial waveform of the interval W39 is classified as being in a group C-5 that is different from any of the preceding groups.

As described above, the partial waveform of each interval is compared with the first partial waveforms of preceding groups, and when a determination is made that the partial waveform is similar to one of the first partial waveforms, the partial waveform is classified as being in a group to which the one first partial waveform belongs, and conversely, when a determination is made that that the partial waveform is dissimilar to each of the first partial waveforms of preceding groups, the partial waveform is classified as being in a new group.

As described above, the FA apparatus 2 repeatedly performs a predetermined identical operation process of, for example, sequentially applying the same processing to multiple workpieces. That is to say, the FA apparatus 2 repeatedly outputs to the data analysis device 1 an output signal generated by the predetermined operation process. Thus, during a period in which the operation process is performed normally, the FA apparatus 2 outputs to the data analysis device 1 a signal including waveforms similar to waveforms of signals that are output during past performance of the operation process. For example, the FA apparatus 2 outputs to the data analysis device 1 a signal that includes, as waveform components thereof, (i) waveforms illustrated in FIG. 3C of the A groups that indicate the operation process of sequentially applying the same processing to the workpieces, (ii) waveforms illustrated in FIG. 3C of the B groups that indicate the operation process of cleaning the workpieces, or the like.

Conversely, upon occurrence of an error or a failure during performance of the operation process, the FA apparatus 2 outputs to the data analysis device 1 a signal including waveform components that are not similar to waveforms of signals output prior to occurrence of such an error. For example, the FA apparatus 2 outputs to the data analysis device 1 a signal that includes, as waveform components thereof, waveforms illustrated in FIG. 3C of the C groups that indicate occurrence of an error such as the workpiece becoming caught by the blade.

A period during which the FA apparatus 2 operates normally to perform the operation process is sufficiently longer than a period during which an error occurs in the operation process. Thus an appearance frequency of waveforms in the input signal that are similar to each other is higher than an appearance frequency of waveforms in the input signal that are dissimilar to each other.

Thus, when an appearance frequency of one waveform in the input signal is equal to or lower than a predetermined threshold value, the one waveform is deemed to be an erroneous waveform indicating occurrence of an error, and the one waveform included in the input signal and deemed to be the erroneous waveform is removed from waveforms included in the input signal. This processing is performed by the data organizer 135 illustrated in FIG. 1. The threshold value is set by, for example, using the engineering tool operating on the external apparatus 3.

In the present embodiment, an appearance frequency of a waveform is obtained based on a number of waveforms included in a group to which the waveform belongs. When a number of waveforms included in a group to which one waveform belongs is larger than or equal to a predetermined threshold value, the one waveform is deemed to have a high appearance frequency. Conversely, when a number of waveforms included in a group to which one waveform belongs is equal to or smaller than the predetermined threshold value, the one waveform is deemed to have a low appearance frequency.

First, the data organizer 135 illustrated in FIG. 1 allocates, for each group, a number of waveforms included in the corresponding group, as illustrated in FIG. 3D. In the present embodiment, a number of waveforms included in the group A-1 is 60, a number of waveforms included in the group A-2 is 58, a number of waveforms included in the group A-3 is 62, a number of waveforms included in the group A-4 is 65, and a number of waveforms included in the group A-5 is 55. A number of waveforms included in the group B-1 is 40, a number of waveforms included in the group B-2 is 38, a number of waveforms included in the group B-3 is 42, a number of waveforms included in the group B-4 is 45, and a number of waveforms included in the group B-5 is 35. A number of waveforms included in the group C-1 is 10, a number of waveforms included in the group C-2 is 8, a number of waveforms included in the group C-3 is 12, a number of waveforms included in the group C-4 is 15, and a number of waveforms included in the group C-5 is 5.

Then the data organizer 135, when the number of allocated waveforms included in a group of the groups is equal to or smaller than the predetermined threshold value, deletes the group. For example, in the case of employing "20" as the predetermined threshold value, the groups C-1-C-5 that each include less than twenty waveforms are deleted, as illustrated in FIG. 3D. This enables removal of erroneous waveforms and leaves only waveforms of the normal models, and the remaining waveforms of the normal models are collected to generate the learning data. The learning data is generated after removing erroneous waveforms and collecting only waveforms of the normal models, and thus highly-accurate learning data can be generated.

As described later in detail, the data learner 134 illustrated in FIG. 1 determines a representative waveform for each group, based on waveforms of the groups included in this learning data. The data learner 134 stores, as the learning result, the representative waveforms of the groups in the auxiliary storage 11 illustrated in FIG. 1. The data analysis device 1, during operation in the diagnosis mode described later, determines whether the diagnosis target FA apparatus 2 operates normally based on a comparison result obtained by comparing this learning result and waveforms of the monitoring signal that are input from the diagnosis target FA apparatus 2.

The learning data described above is data that is generated based on waveforms included in multiple groups and serving as the normal models. As described above, waveforms similar to each other are grouped, and thus each of the groups includes multiples waveforms similar to each other. Thus, comparing the waveform of the monitoring signal with the waveforms included in the learning data is synonymous with comparing the waveform of the monitoring signal with waveforms that are similar to each other. Because the results produced by performing the multiple comparisons are nearly the same, the result of such comparison is not particularly meaningful.

For the aforementioned reason, a representative waveform is determined for each group, and the waveform of the monitoring signal is compared with these representative waveforms. The representative waveform is determined by, for example, employing a single freely-selected waveform from among waveforms included in the group, or performing phase-averaging of waveforms of the group. A high similarity means that a sum of square errors of each waveform at sample points is small and close to 0. Comparing the waveform of the monitoring signal with the representative waveforms can achieve a number of comparisons performed in the diagnosis mode smaller than when comparing with all the waveforms included in the groups. That is to say, processing can be ended more quickly than in the case of execution of comparison in the diagnosis mode of all the waveforms included in the groups.

Figure 4:
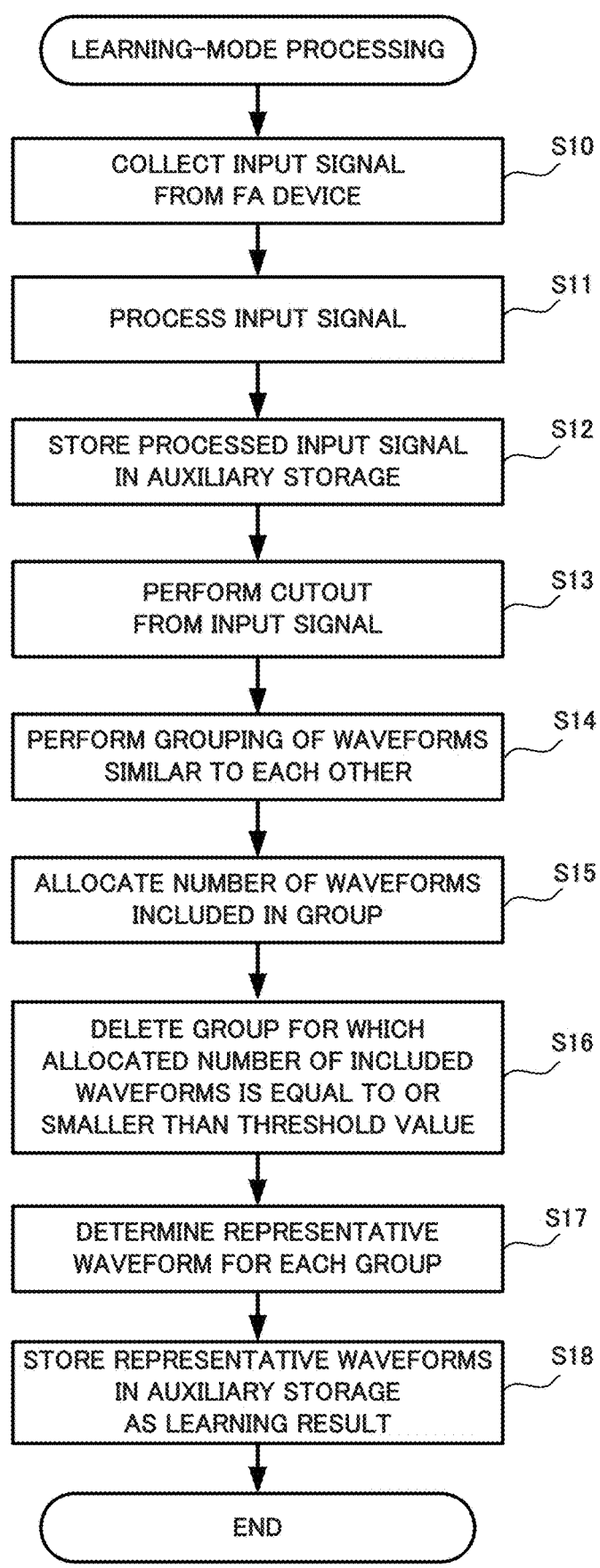
FIG. 4 is a flowchart of learning-mode processing.
Figure 5:
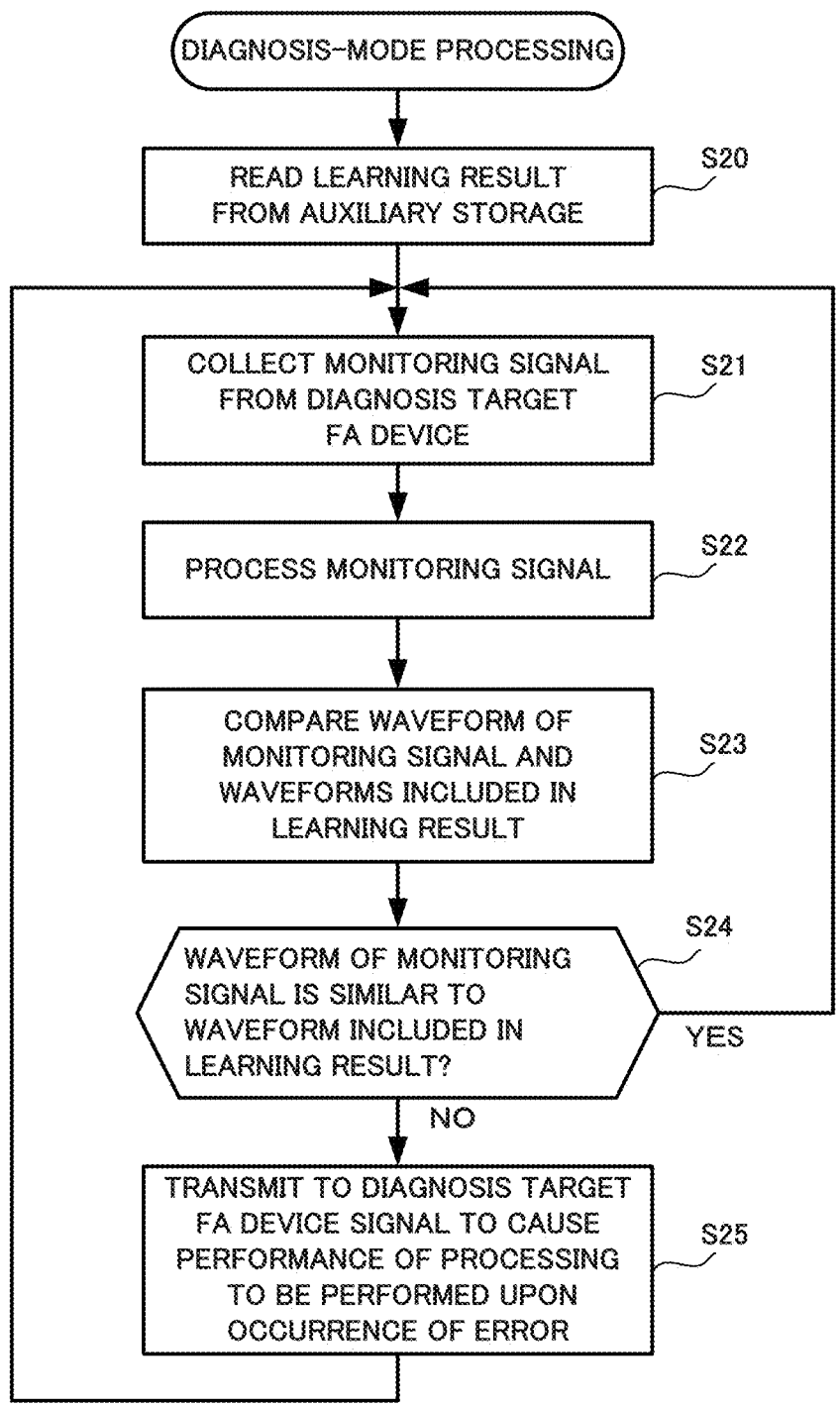
FIG. 5 is a flowchart of diagnosis-mode processing.

Next, processing performed by the data analysis device 1 operating in the learning mode and processing performed by the data analysis device 1 operating in the diagnosis mode are described with reference to FIGS. 4 and 5. First, the processing performed by the data analysis device 1 operating in the learning mode is described with reference to a flowchart of learning-mode processing illustrated in FIG. 4. Operations of the learning-mode processing are stored, as a learning-mode processing program, in the auxiliary storage device 101 illustrated in FIG. 2. The learning-mode processing program is loaded from the auxiliary storage device 101 into the memory 102 at a time of startup of the data analysis device 1. The processor 103 executes the learning-mode processing program loaded into the memory 102.

The user, before causing the data analysis device 1 to monitor the operation of the FA apparatus 2 during running, causes execution by the data analysis device 1 in the learning mode. The data collector 131 of the data analysis device 1 illustrated in FIG. 1 collects the input signal from the FA apparatus 2 via the communication I/F 10 (step S10). The data collector 131 collects the input signal from the FA apparatus 2 every one sample period. A freely-selected period is set as this one sample period via the engineering tool operating on the external apparatus 3 illustrated in FIG. 1.

The data collector 131 transmits the collected input signal to the data processor 132 illustrated in FIG. 1. The data processor 132 processes the input signal (step S11). The data processor 132 transmits the processed input signal to the file storage 133 illustrated in FIG. 1. The file storage 133 stores the processed input signal in the auxiliary storage 11 illustrated in FIG. 1 (step S12).

The data learner 134 illustrated in FIG. 1 reads the input signal stored in the auxiliary storage 1. The data learner 134 divides the read input signal into the intervals W. Specifically, the data learner 134 cuts out waveforms of the input signal by, while superimposing the interval W on time t, shifting the interval W every one sample period (step S13).

The data learner 134 performs comparisons between partial waveforms. Each of the comparisons is performed by, for example, superimposing partial waveforms and obtaining a sum of square errors in wave height values of the partial waveforms at sample points. The data learner 134, when a sum of square errors in wave height values of partial waveforms at sample points is equal to or smaller than a predetermined threshold value, determines that the partial waveforms is similar to each other, and performs grouping of waveforms into groups that each include waveforms similar to each other (step S14).

The data organizer 135 allocates, for each group formed by the data learner 134, a number of partial waveforms included in the corresponding group (step S15). The data organizer 135 deletes a group for which an allocated number of included waveforms is equal to or smaller than the predetermined threshold value (step S16). Data of groups that are left as a result of the deletion serves as the normal models. The data organizer 135 collects the data serving as the normal models to generate the learning data. The data organizer 135 transmits the generated leaning data to the data learner 134. Also, the data organizer 135 stores the learning data in the auxiliary storage 11.

The data learner 134 determines a representative waveform for each group included in the learning data received from the data organizer 135, based on waveforms included in the group (step S17). The representative waveform is determined by, for example, employing single freely-selected waveform for a group from among waveforms included in the group, or performing phase-averaging the waveforms included in a group. The data learner 134 stores, in the auxiliary storage 11, data of the representative waveforms of the groups as a learning result (step S18).

Next, the processing performed by the data analysis device 1 operating in the diagnosis mode is described with reference to a flowchart of diagnosis-mode processing illustrated in FIG. 5. Operations performed in the diagnosis-mode processing are stored, as a diagnosis-mode processing program, in the auxiliary storage device 101 illustrated in FIG. 2. The diagnosis-mode processing program is loaded from the auxiliary storage device 101 into the memory 102 at the time of startup of the data analysis device 1. The processor 103 executes the learning-mode processing program loaded into the memory 102.

The user, in order to cause the data analysis device 1 to monitor the operation of the FA apparatus 2 during running, causes the data analysis device 1 to execute in the diagnosis mode. The data determiner 136 of the data analysis device 1 illustrated in FIG. 1 reads the learning result from the auxiliary storage 11 illustrated in FIG. 1 (step S20). This learning result is data of the representative waveforms of the groups that each are determined by the data learner 134, in step S17 of the learning-mode processing illustrated in FIG. 4, to be a representative waveform of the corresponding group. The data determiner 136 writes the read learning result to the memory 102 illustrated in FIG. 2. By performing this writing, the data determiner 136 can, when referring to the learning result, refer to the learning result faster rather than in the case of reading the learning result from the auxiliary storage 11.

The data collector 131 of the data analysis device 1 illustrated in FIG. 1 collects an input signal from the diagnosis target FA apparatus 2 via the communication I/F 10 (step S21). Hereinafter, this input signal is referred to as the "monitoring signal". The data collector 131 transmits the collected monitoring signal to the data processor 132 illustrated in FIG. 1. The data processor 132 processes the monitoring signal (step S22).

The data processor 132 transmits the processed monitoring signal to the data determiner 136 illustrated in FIG. 1. The data determiner 136 compares (i) the waveforms included in the learning result read from the auxiliary storage 11 in step S20 described above and (ii) a waveform of the monitoring signal received from the data determiner 136 (step S23). This comparison between waveforms is achieved by, for example, cross-correlation by determining correlation coefficients of data at each time in two waveforms. However, this method is not limiting, and various types of methods that can compare two waveforms may be employed.

When a waveform included in the learning result is similar to the waveform of the monitoring signal (YES in step S24), the data analysis device 1 determines that operation of the diagnosis target FA apparatus 2 is normal. Thereafter, the data analysis device 1 repeats the processing from step S21 to step S24.

When the waveforms included in the learning result are not similar to the waveform of the monitoring signal (NO in step S24), the data determiner 136 transmits a result of the determination to the response implementer 137 illustrated in FIG. 1. The response implementer 137 transmits to the diagnosis target FA apparatus 2, based on the determination result received from the data determiner 136, via the communication I/F 10, a signal to cause performance of processing to be performed upon occurrence of a predetermined error (step S25). The signal to cause performance of processing to be performed upon occurrence of an error is, for example, a stop signal to stop the operation of the diagnosis target FA apparatus 2, a slowdown instruction signal to slow down the operation of the diagnosis target FA apparatus 2, or the like. Thereafter, the data analysis device 1 repeats the processing from step S21 to step S25.

The signal transmitted from the response implementer 137 allows the diagnosis target FA apparatus 2 to quickly perform the processing to be performed upon occurrence of an error. This enables minimization of damage caused by the diagnosis target FA apparatus 2, such as destruction of a product during manufacturing as a result of occurrence of an error and water leakage in the FA apparatus 2.

As described above, the data analysis device 1 according to the present embodiment, during operation in the learning mode, groups the waveforms of the input signal input from the FA apparatus 2 by grouping together waveforms that are similar to each other, and when a number of waveforms included in a group is equal to or smaller than a threshold value, deletes the group. This enables removal of a group with a low appearance frequency, that is, removal of data of erroneous waveforms, and thus enables leaving only data of waveforms of the normal models, leading to generation of highly-accurate learning data.

Further, the learning mode of the data analysis device 1 includes determining a representative waveform for each group and storing, in the auxiliary storage 11, these representative waveforms as the learning result. Such operation enables reduction in a number of comparisons performed in the diagnosis mode in comparison to the case of performing comparison with all the waveforms included in the groups.

That is to say, ending of processing of comparing with the monitoring signal that is performed by the data analysis device 1 in the diagnosis mode can be achieved faster than in the case of comparison with all the waveforms included in the groups. This improves real-timeliness of processing in the diagnosis mode, and thus the processing to be performed upon occurrence of an error can be performed quickly upon occurrence of an error in the diagnosis target FA apparatus 2.

Modified Example 1

Modes of the data analysis device 1 according to the aforementioned embodiment include both the learning mode and the diagnosis mode. However, this configuration is not limiting, and a configuration may be employed in which the data analysis device 1 includes the diagnosis mode, and the external apparatus 3 illustrated in FIG. 1 includes the learning mode. In the case of this configuration, the user generates the learning result by execution by the external apparatus 3 in the learning mode. Prior to causing execution by the data analysis device 1 in the diagnosis mode, the user causes the external apparatus 3 to store learned data in the auxiliary storage 11 illustrated in FIG. 1. This allows the data analysis device 1 to, during operation in the diagnosis mode, make a determination on the monitoring signal input from the diagnosis target FA apparatus 2 based on the learning result. In the case of this configuration, processing blocks that are included in the processor unit 13 illustrated in FIG. 1 and operate during operation in the learning mode, that is, the data collector 131, the data processor 132, the file storage 133, the data learner 134, and the data organizer 135, are included in the external apparatus 3. Further, configurations may be used such as a configuration that provides a learning-dedicated device instead of including these processing blocks in the external apparatus 3.

Modified Example 2

In the aforementioned embodiment, an example of performing the learning mode and the diagnosis mode separately is mainly described. However, the present disclosure is not limited to this example. By causing the file storage 133, the data learner 134, and the data organizer 135 to operate during operation in the diagnosis mode as described above, the learning result can be updated and the processing of the learning mode executed in learning mode in parallel with the processing of the diagnosis mode of the FA apparatus 2.

Modified Example 3

According to the aforementioned embodiment, the data analysis device 1 includes the data processor 132 as illustrated in FIG. 1, and the data processor 132 processes, during operation of the data analysis device 1 in the learning mode and the diagnosis mode, the input signal that is input from the FA apparatus 2. However, this configuration is not limiting, and a configuration may be employed in which the data analysis device 1 does not process the input signal during operation in the learning mode and the diagnosis mode and uses as is the input signal input from the FA apparatus 2. In the case of this configuration, the data processor 132 may be omitted from the data analysis device 1, or the data processor 132 may be set by the external apparatus 3 illustrated in FIG. 1 so as not to allow processing of the input signal.

Modified Example 4

According to the aforementioned embodiment, the signal output from the diagnosis target FA apparatus 2 is used as a signal for learning and an analysis target signal. The signal output from the diagnosis target FA apparatus 2 may be a signal generated by the FA apparatus 2 during the operation process or may be an output signal that is output from a sensor attached to a main body of the FA apparatus 2, such as a vibration sensor, a noise sensor, a temperature sensor, a pressure sensor, a current sensor, a voltage sensor, and a power sensor.

Modified Example 5

According to the aforementioned embodiment, the signal for learning and the analysis target signal are each a signal output from the diagnosis target FA apparatus 2. However, multiple signals output from the diagnosis target FA apparatus 2 may be used as multiple signals for learning and multiple analysis target signals. In the case of this configuration, learned data is generated for each output signal from multiple sensors such as a noise sensor, a temperature sensor, and a current sensor. Then, an output signal from the noise sensor is evaluated based on the learned data for the noise sensor, an output signal from the temperature sensor is evaluated based on the learned data for the temperature sensor, and an output signal from the current sensor is evaluated based on the learned data for the current sensor. The determination indicating occurrence of malfunction is made, for example, when any of an evaluation value of the output signal from the noise sensor, an evaluation value of the output signal from the temperature sensor, and an evaluation value of the output signal from the current sensor is less than a reference value.

Modified Example 6

In order to remove signal waveforms that do not apply to the normal models, an auxiliary reference different from the reference employed in the aforementioned embodiment may be employed. For example, in the case of a configuration in which an inspection device for inspection of goodness/badness of the workpiece processed by the FA apparatus 2 is installed, signal waveforms of the output signal and IDs of workpieces that are processing targets may be stored beforehand in association with each other, and when a determination is made by the inspection of one workpiece that the one workpiece is to be rejected, signal waveforms associated with the ID of the one workpiece may be removed. Further, the IDs may be timestamps indicating times of processing of the workpieces.

Modified Example 7

In the aforementioned embodiment, an example is described in which the FA apparatus 2 is an apparatus that repeatedly performs processing such as processing of a workpiece, the FA apparatus 2 supplies a signal to the data analysis device 1 repeatedly, and the FA apparatus 2 maintains a normal operating state thereof sufficiently longer than an abnormal operating state thereof. The present disclosure is not limited to this example and is widely applicable to learned-data generation processing and diagnosis processing for a device having an output fraction of normal waveforms higher than an output fraction of abnormal waveforms.

Modified Example 8

The aforementioned embodiment employs, as a method for performing comparisons between waveforms, superimposing freely-selected two partial waveforms and obtaining a sum of square errors in wave height values of the two partial waveforms at the sample points. However, this configuration is not limiting, and various types of similarity-calculation methods that can obtain a difference in shapes of waveforms may be employed.

Modified Example 9

According to the aforementioned embodiment, the engineering tool is installed in the external apparatus 3. However, this configuration is not limiting, and the engineering tool may be installed in the data analysis device 1. In the case of this configuration, the engineering tool may be started based on an instruction from the external apparatus 3 connected to the data analysis device 1. For example, an icon for starting the engineering tool may be provided on the display 31 of the external apparatus 3. The user can start the engineering tool by, for example, selecting and confirming the icon, or double-clicking the icon.

Modified Example 10

In the aforementioned embodiment, for each group, a number of waveforms included in the group is allocated, and when the number of waveforms included in a group is equal to or smaller than a threshold value, the waveforms included in the group are removed as waveforms having a low appearance frequency. However, this configuration is not limiting, and a configuration may be employed in which a threshold value is set as a ratio of a number of waveforms included in the group to an overall number of waveforms included in all groups, and when the number of waveforms included in the group is equal to or smaller than the threshold value, these waveforms are removed as waveforms having a low appearance frequency.

Modified Example 11

According to the aforementioned embodiment, partial waveforms that are cut out from a waveform are classified, based on differences in shapes thereof as being in the groups A-1-A-5, the groups B-1-B-5, and the groups C-1-C-5. However, this configuration is not limiting, and the grouping may be performed based on differences in shapes of waveforms. For example, the groups A-1-A-5 may be classified as being in a group A, the groups B-1-B-5 may be classified as being in a group B, and the groups C-1-C-5 may be classified as being in a group C.

Modified Example 12

According to the aforementioned embodiment, a group in which a partial waveform is classified as being is determined based on whether the partial waveform is similar to the first partial waveforms of the preceding groups. However, in practice, a partial waveform to be inspected may be similar to multiple partial waveforms. In this case, group membership can be determined in accordance with a predetermined classification rule, such as (i) "classify as being in a group to which a partial waveform with the highest similarity belongs", or (ii) "classify as being in a group including the largest number of partial waveforms that are determined to be similar".

According to the present disclosure, the learning-mode processing program, a waveform aggregation processing program, and the diagnosis-mode processing program are stored in the auxiliary storage device 101 illustrated in FIG. 2. Distribution of these programs can be achieved by storing these programs in a computer-readable recording medium, such as a compact disc read-only memory (CD-ROM), a digital versatile disc read only memory (DVD-ROM), and installing these programs in a computer enables achievement of a computer that can perform the above-described processing. In the case where the above-described processing is implemented by allotment between an operating system (OS) and an application, or by cooperation between the OS and the application, for example, the application may be stored alone on the recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can be used with advantage for a data analysis device.

REFERENCE SIGNS LIST

1 Data analysis device
2 FA apparatus
3 External apparatus
10 Communication I/F
11 Auxiliary storage
12 External-apparatus I/F
13 Processor unit
31 Display
32 Inputter
101 Auxiliary storage device
102 Memory
103 Processor
104 Communication port
105 Screen display outputter
106 I/O port
107 Internal bus
131 Data collector
132 Data processor
133 File storage
134 Data learner
135 Data organizer
136 Data determiner
137 Response implementer
138 Parameter setter

The invention claimed is:

1. A data analysis device comprising:
a data collector to collect signals supplied from a plurality of apparatuses connected to the data analysis device, the signals including a signal supplied when at least one of the apparatuses is in a normal operating state and a signal supplied when at least one of the apparatuses is in an abnormal operating state;
a data learner to create waveforms including signals cut out at predetermined intervals from the signals collected by the data collector, the data learner being further configured to classify the waveforms into groups of mutually-similar waveforms in accordance with a predetermined classification basis; and
a data organizer to generate learning data by (i) removing waveforms, determined by an external inspection device to be rejected, associated with at least one of the plurality of apparatuses and (ii) collecting waveforms remaining after the removing as the learning data,
wherein the external inspection device determines whether to accept or reject a workpiece processed by the at least one of the plurality of apparatuses, and
the data organizer removes the waveforms associated with a workpiece processed by the at least one of the plurality of apparatuses that the external inspection device determines to reject.

2. The data analysis device according to claim 1, wherein the data organizer (i) allocates, for each of the groups, a number of waveforms included in the corresponding group and (ii) when the allocated number of waveforms included in a group is equal to or smaller than a predetermined threshold value, removes the group from the learning data.

3. The data analysis device according to claim 2, further comprising:
an auxiliary storage, wherein
the data learner determines a representative waveform for each group based on the waveforms included in the learning data and stores in the auxiliary storage the representative waveforms as a learning result.

4. The data analysis device according to claim 3, wherein
the data collector collects a monitoring signal supplied from the apparatus that is a diagnosis target, and
the data analysis device further includes:
a data determiner to read the learning result from the auxiliary storage and to determine whether a waveform of the monitoring signal matches the waveforms included in the learning data; and
a response implementer to transmit, to the diagnosis target apparatus, based on a result of the determination by the data determiner, a signal to cause performance of predetermined processing.

5. The data analysis device according to claim 2, wherein each of the apparatuses connected to the data analysis device is an apparatus that repeatedly performs processing, supplies the signal to the data collector repeatedly, and maintains a normal operating state thereof longer than an abnormal operating state thereof.

6. The data analysis device according to claim 1, wherein the data organizer (i) allocates, for each of the groups, a number of waveforms included in the corresponding group and (ii) when the allocated number of waveforms included in a group is equal to or larger than a predetermined threshold value, generates the learning data by collecting the waveforms included in the group.

7. The data analysis device according to claim 6, further comprising:
an auxiliary storage, wherein
the data learner determines a representative waveform for each group based on the waveforms included in the learning data and stores in the auxiliary storage the representative waveforms as a learning result.

8. The data analysis device according to claim 7, wherein
the data collector collects a monitoring signal supplied from the apparatus that is a diagnosis target, and
the data analysis device further includes:
a data determiner to read the learning result from the auxiliary storage and to determine whether a waveform of the monitoring signal matches the waveforms included in the learning data; and
a response implementer to transmit, to the diagnosis target apparatus, based on a result of the determination by the data determiner, a signal to cause performance of predetermined processing.

9. The data analysis device according to claim 6, wherein each of the apparatuses connected to the data analysis device is an apparatus that repeatedly performs processing, supplies the signal to the data collector repeatedly, and maintains a normal operating state thereof longer than an abnormal operating state thereof.

10. The data analysis device according to claim 1, further comprising:
an auxiliary storage, wherein
the data learner determines a representative waveform for each group based on the waveforms included in the learning data and stores in the auxiliary storage the representative waveforms as a learning result.

11. The data analysis device according to claim 10, wherein
the data collector collects a monitoring signal supplied from the apparatus that is a diagnosis target, and
the data analysis device further includes:
a data determiner to read the learning result from the auxiliary storage and to determine whether a waveform of the monitoring signal matches the waveforms included in the learning data; and
a response implementer to transmit, to the diagnosis target apparatus, based on a result of the determination by the data determiner, a signal to cause performance of predetermined processing.

12. The data analysis device according to claim 11, wherein each of the apparatuses connected to the data analysis device is an apparatus that repeatedly performs processing, supplies the signal to the data collector repeatedly, and maintains a normal operating state thereof longer than an abnormal operating state thereof.

13. The data analysis device according to claim 10, wherein each of the apparatuses connected to the data analysis device is an apparatus that repeatedly performs processing, supplies the signal to the data collector repeatedly, and maintains a normal operating state thereof longer than an abnormal operating state thereof.

14. The data analysis device according to claim 1, wherein the apparatus connected to the data analysis device is an apparatus that repeatedly performs processing, supplies the signal to the data collector repeatedly, and maintains a normal operating state thereof longer than an abnormal operating state thereof.

15. The data analysis device according to claim 1, wherein each of the apparatuses connected to the data analysis device is an apparatus that repeatedly performs processing, supplies the signal to the data collector repeatedly, and maintains a normal operating state thereof longer than an abnormal operating state thereof.

16. A system comprising:
a data learner to create waveforms including signals collected at predetermined intervals from a plurality of apparatuses and classified into groups of mutually-similar waveforms in accordance with a predetermined classification basis;
a data organizer to generate learning data by (i) removing waveforms, determined by an external inspection device to be rejected, associated with at least one of the plurality of apparatuses, and (ii) collecting waveforms remaining after the removing as the learning data; and
the data learner is further configured to determine a representative waveform based on the learning data generated by the data organizer and to store the representative waveform as a learning result,
wherein the external inspection device determines whether to accept or reject a workpiece processed by the at least one of the plurality of apparatuses, and
the data organizer removes the waveforms associated with a workpiece processed by the at least one of the plurality of apparatuses that the external inspection device determines to reject.

17. A method implemented by a computer, the method comprising:
collecting input signals from a plurality of apparatuses including a signal supplied when at least one of the apparatuses is in a normal operating state and a signal supplied when at least one of the apparatuses is in an abnormal operating state;
creating waveforms including signals cut out at predetermined intervals from the signals collected by the collecting;
classifying the waveforms into groups of mutually-similar waveforms in accordance with a predetermined classification basis;
generating learning data by (i) removing waveforms, determined by an external inspection device to be rejected, associated with at least one of the plurality of apparatuses and (ii) collecting waveforms remaining after the removing as the learning data; and determining a representative waveform based on the learning data and storing the representative waveform as a learning result, wherein the external inspection device determines whether to accept or reject a workpiece processed by the at least one of the plurality of apparatuses, and the generating learning data removes the waveforms associated with a workpiece processed by the at least one of the plurality of apparatuses that the external inspection device determines to reject.

18. A non-transitory recording medium storing a program causing a computer to function as:

a data collector to collect signals supplied from a plurality of apparatuses, the signals including a signal supplied when at least one of the apparatuses is in a normal operating state and a signal supplied when at least one of the apparatuses is in an abnormal operating state;

a data learner to create waveforms including signals cut out at predetermined intervals from the signals collected by the data collector, the data learner being further configured to classify the waveforms into groups of mutually-similar waveforms in accordance with a predetermined classification basis; and a data organizer to generate learning data by (i) removing waveforms, determined by an external inspection device to be rejected, associated with at least one of the plurality of apparatuses and (ii) collecting waveforms remaining after the removing as the learning data, wherein the external inspection device determines whether to accept or reject a workpiece processed by the at least one of the plurality of apparatuses, and the data organizer removes the waveforms associated with a workpiece processed by the at least one of the plurality of apparatuses that the external inspection device determines to reject.

* * * * *